(12) United States Patent
Vezzoli

(10) Patent No.: US 11,819,929 B2
(45) Date of Patent: Nov. 21, 2023

(54) DEVICE FOR THE CONTROLLED STABILIZATION OF TOOL HOLDER SHANKS

(71) Applicant: ALGRA S.P.A., Val Brembilla (IT)

(72) Inventor: Giovanni Vezzoli, Val Brembilla (IT)

(73) Assignee: ALGRA S.P.A., Val Brembilla (IT)

(*) Notice: Subject to any disclaimer, the term of this patent is extended or adjusted under 35 U.S.C. 154(b) by 592 days.

(21) Appl. No.: 16/928,298

(22) Filed: Jul. 14, 2020

(65) Prior Publication Data
US 2021/0016365 A1 Jan. 21, 2021

(30) Foreign Application Priority Data

Jul. 15, 2019 (IT) .................... 102019000011766

(51) Int. Cl.
*B23B 31/00* (2006.01)

(52) U.S. Cl.
CPC ........ *B23B 31/006* (2013.01); *B23B 2240/04* (2013.01)

(58) Field of Classification Search
CPC ... B23B 31/006; B23B 2240/04; B23B 31/20; B23B 2231/04; B23B 2260/106; B23B 31/113
See application file for complete search history.

(56) References Cited

U.S. PATENT DOCUMENTS 4,456,271 A * 6/1984 Kern .................... B23B 31/113
279/158
2006/0197292 A1 9/2006 Oshnock et al.

FOREIGN PATENT DOCUMENTS

| CN | 109014263 A | * | 12/2018 |
|---|---|---|---|
| DE | 3938689 A1 | | 5/1991 |
| DE | 102005016161 A1 | | 10/2006 |
| DE | 102009030386 A1 | * | 12/2010 |
| FR | 2579913 A1 | * | 1/1986 |
| FR | 2616071 A1 | | 12/1988 |
| GB | 2256381 A | * | 12/1992 |
| GB | 2256381 A1 | | 12/1992 |
| JP | H0611907 U | * | 2/1994 |

OTHER PUBLICATIONS

Search Report from Priority Application No. IT 2019000011766 dated Mar. 9, 2020.

* cited by examiner

*Primary Examiner* — Sunil K Singh
*Assistant Examiner* — Reinaldo A Vargas Del Rio
(74) *Attorney, Agent, or Firm* — AMSTER, ROTHSTEIN & EBENSTEIN

(57) ABSTRACT

A device for the controlled stabilization of tool holder shanks on the respective ring nut, the tool holder shanks, motorized or non-motorized, being predisposed for ER or other type fixing. The device comprises a ring nut and a tool holder shank of a truncated conical shape provided externally with a groove in which means connecting the ring nut to the tool holder are arranged inside the ring nut. The connecting means consist of an annular body formed of at least two shaped half-rings that define opposite protrusions projecting outwardly and centrally to form a shaped prominence having an arched-convex outer profile; on each of the shaped prominences a recess is made predisposed to house respective elastic pins, by means of which the shaped half-rings are firmly connected inside the ring nut blind holes.

6 Claims, 5 Drawing Sheets

DEVICE FOR THE CONTROLLED STABILIZATION OF TOOL HOLDER SHANKS

CROSS REFERENCE TO RELATED APPLICATION

This application claims priority to Italian application No. 102019000011766 filed Jul. 15, 2019, the content of which is incorporated by reference in its entirety.

FIELD OF INVENTION

The present invention relates to a device for the controlled stabilization of tool holder shanks. More specifically, the present invention relates to a device suitable to block tool holder shanks on the respective ring nut to stabilize the shank in the rotating shaft.

BACKGROUND OF THE INVENTION

The tool-holder shanks, motorized or not, are preferably but not critically constructed with the ER type fastening predisposition; the device of the invention is advantageously applied to CNC machine tools such as multi-spindle or single-spindle lathes, turning and milling centres, transfer machine tools, for orienting and clamping the different tool holder shanks in the appropriate seats of the spindles or rotating shafts of mechanical bodies known as motorised or non-motorised tool holders, multiple or single tool holders.

As is well known, two half-rings are traditionally used to block the tool holder shanks on the respective ring nut, which are positioned in a special groove made on the central outer part of the shanks themselves; said half-rings remain in position in the groove due to the action of the grease they are coated with. The subsequent attachment between the shanks and the ring nut is by means of dowels, which are inserted radially into the respective threaded holes made on said ring nut and abut the semi-rings with the pointed end, fixing onto them. In this way, the shank and the ring nut can rotate freely and the ring nut is then connected by means of its internal thread to the front of the rotating shaft.

This known solution has major drawbacks, related to the use of the locking dowels inserted radially into the ring nut. In fact, it may happen that said dowels, as a result of the vibrations that occur during machining, may loosen and progressively unscrew; the centrifugal force to which they are subjected for the rotation of the ring nut may cause them to escape completely from the respective threaded hole. A dowel may thus be thrown violently into the working environment and cause serious injury to a person in the nearby area; such an event may also cause serious damage to the machine tool on which the tool holder shank locking ring nut is installed.

French patent no. FR 2 616 071 describes a device for the controlled stabilisation on the respective ring nut of ER-type fastening tool holder shanks, in which a truncated cone shaped shank is fitted externally with a groove for housing means of attachment to the tool holder. US 2006/197292 discloses the solution of assembling a collet assembly with lock nut by inserting a retention tab inside the groove of the collet itself. GB 2 256 381 describes a fixing device for releasably fixing different collets to a chuck body of a machine tool chuck; this device comprises an external body permanently bolted to the chuck and a ring insert fitted with radially outward-facing fins. DE 39 38 689 describes a collet holder for the Chuck of a machine tool, in which the collet is held at the front end by a threaded ring and fits into a sliding cup on which there are two opposite and mobile wedges for clamping the collet onto the tool shank. DE 10 2005 016161 concerns a clamping nut for fixing a chuck in a holding position, wherein the clamping unit comprises an element such as a spring-loaded ball.

SUMMARY

The purpose of the present invention is to overcome the drawbacks complained of above.

More specifically, the purpose of the present invention is to provide a device for the controlled stabilization of tool holder shanks in which the blocking of the tool holder shanks to the respective ring nut is carried out safely, without the danger of accidental detachment of parts connected to the ring nut.

A further purpose of the invention is to provide a device as defined above in which the means of connection between the ring nut and the tool holder shanks are placed inside the ring nut itself and therefore in a position of total safety.

Last but not least, the purpose of the invention is to provide a device in which said means of connection are permanently stabilised with respect to the ring nut and the tool holder shank.

A further aim of the invention is to provide a device that ensures that the tool holder shank remains permanently in the operating position without any possibility of axial displacement.

A further purpose of the invention is to make available to users a device for the controlled stabilization of tool holder shanks suitable to ensure a high level of resistance and reliability over time, in addition such as to be easily and economically made.

These and other purposes are achieved by the device for the controlled stabilization of tool holder shanks of the present invention according to the main claim.

BRIEF DESCRIPTION OF THE DRAWINGS

The construction and functional characteristics of the device of the present invention will be more clearly comprehensible from the detailed description below in which reference is made to the appended drawings/diagrams which show a preferred and non-limiting embodiment and wherein.

DETAILED DESCRIPTION

Figure 1:
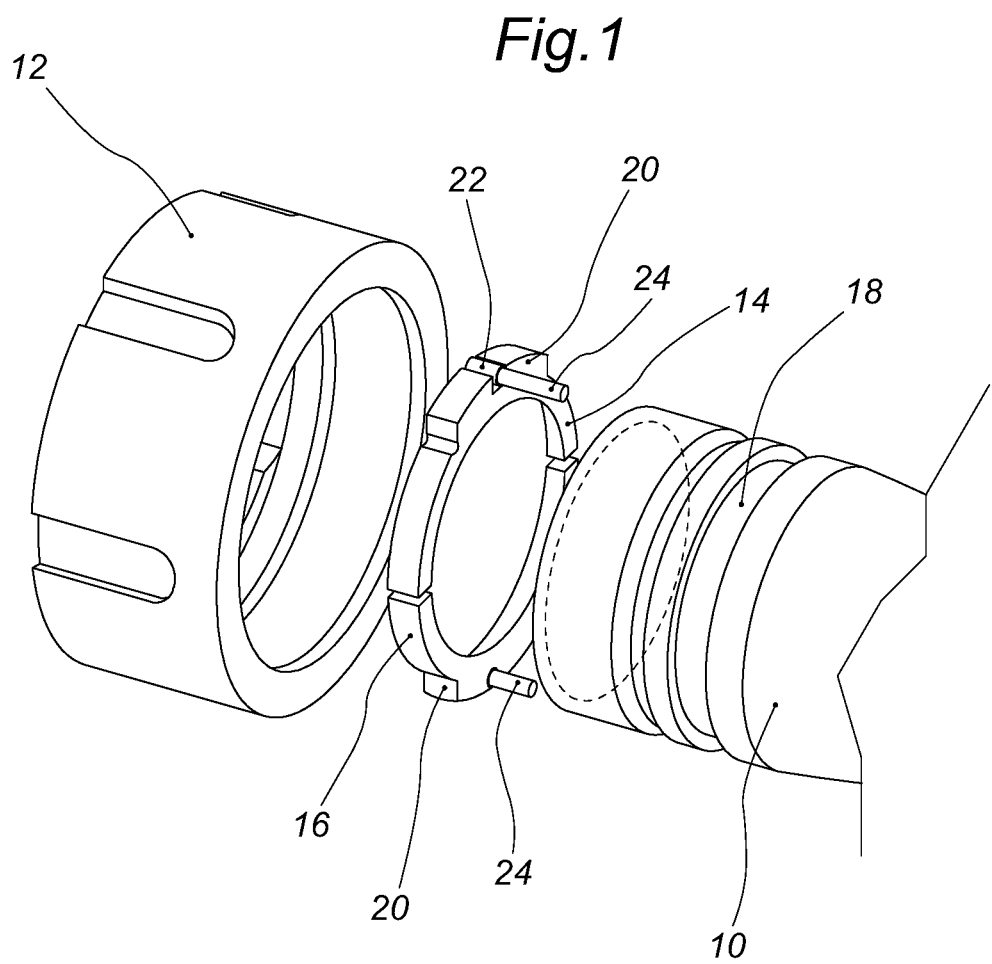
FIG. 1 represents schematically, an exploded view of the device according to the invention, suitable to fix a tool holder shank to the respective ring nut.

With initial reference to FIG. 1, the device for the controlled stabilisation of tool holder shanks of the present invention comprises a tool holder shank 10, a ring nut 12 and an annular body formed of at least two shaped half rings 14 and 16. The tool holder shank 10 conventionally defines a truncated cone shape and is provided on the outside with a groove 18, e.g. with a rectangular profile, made along its outer lateral surface to accommodate the shaped half-rings 14 and 16; it is understood that the latter may be made in a number of complementary parts greater than two.

Figure 2:
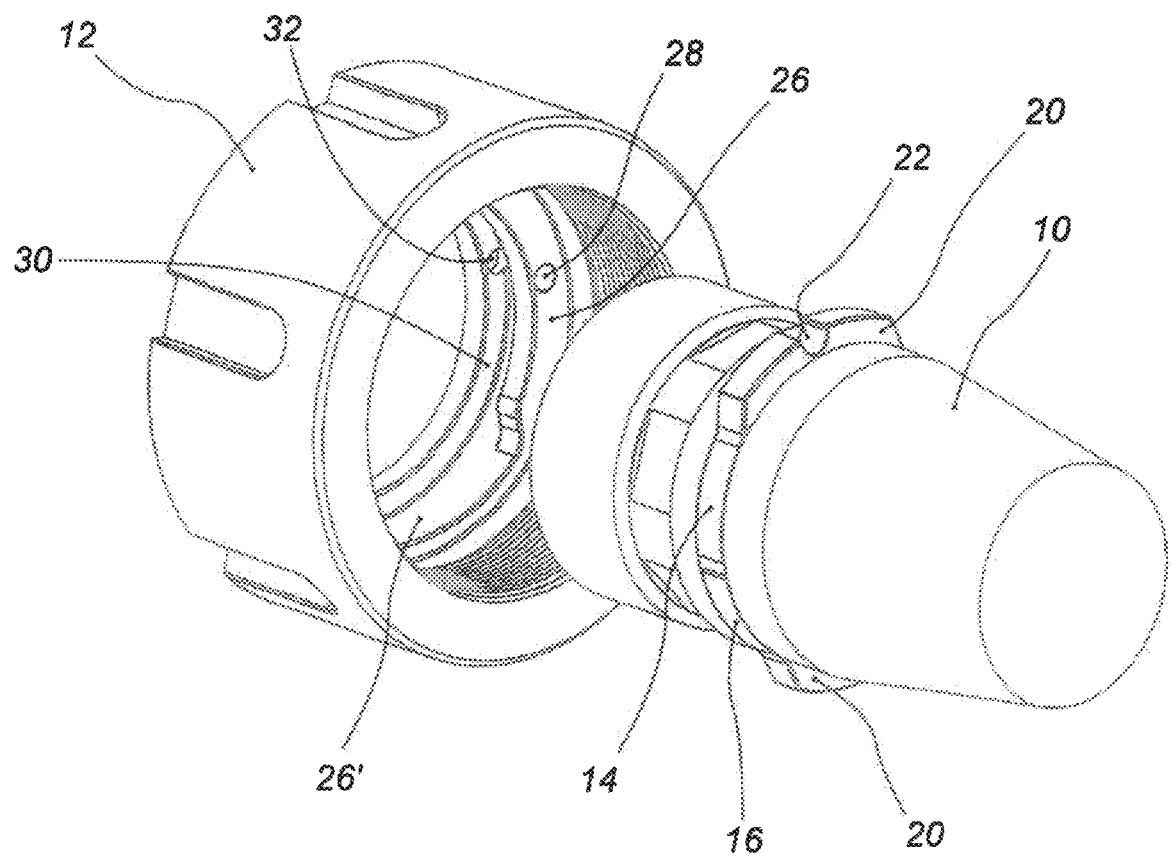
FIG. 2 shows schematically, in exploded view, the same device to highlight the means provided on the tool holder shank for the connection to the respective ring nut.
Figure 3:
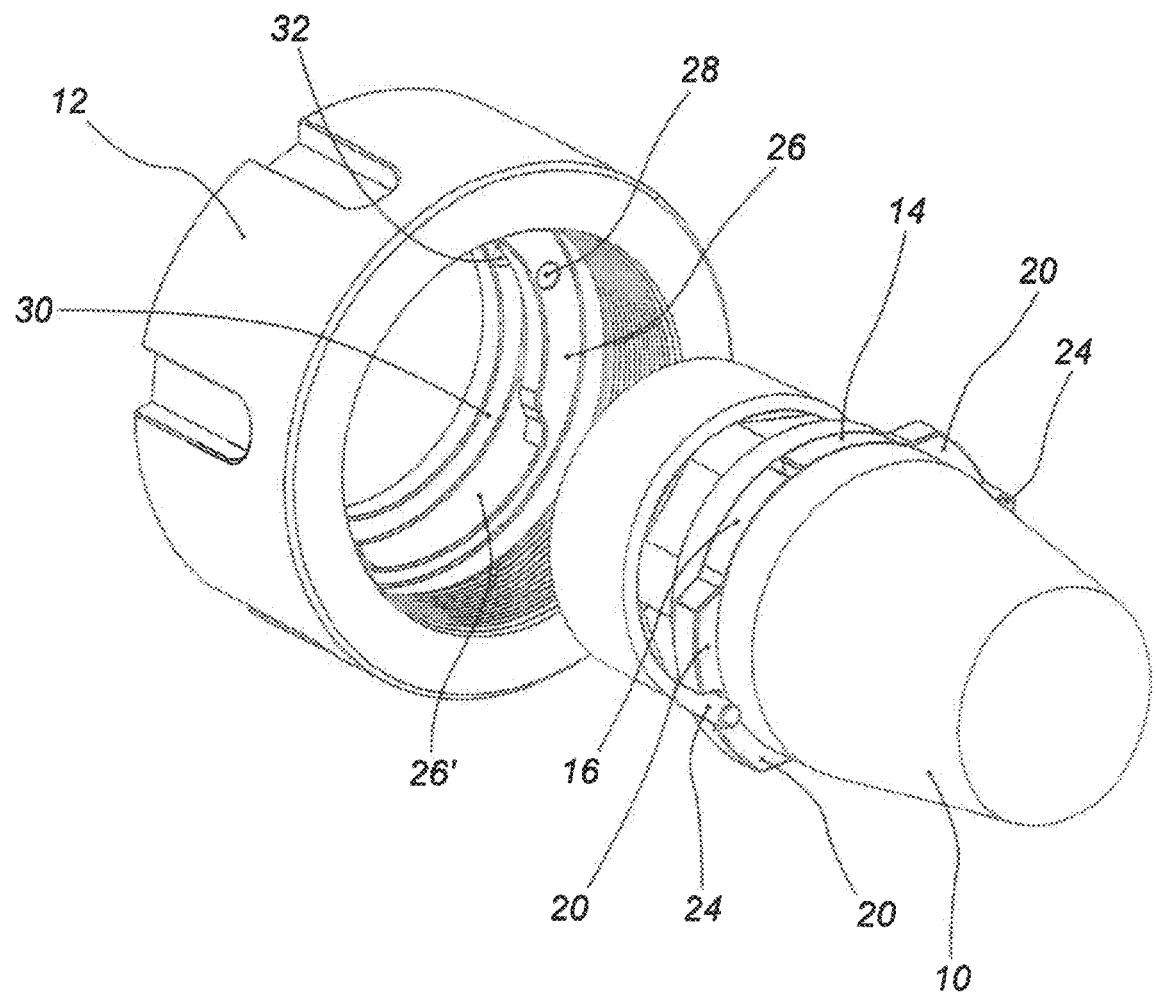
FIG. 3 shows schematically, in exploded view, the same device in which said means of connection are provided with elastic pins suitable to engage with the ring nut.
Figure 4:
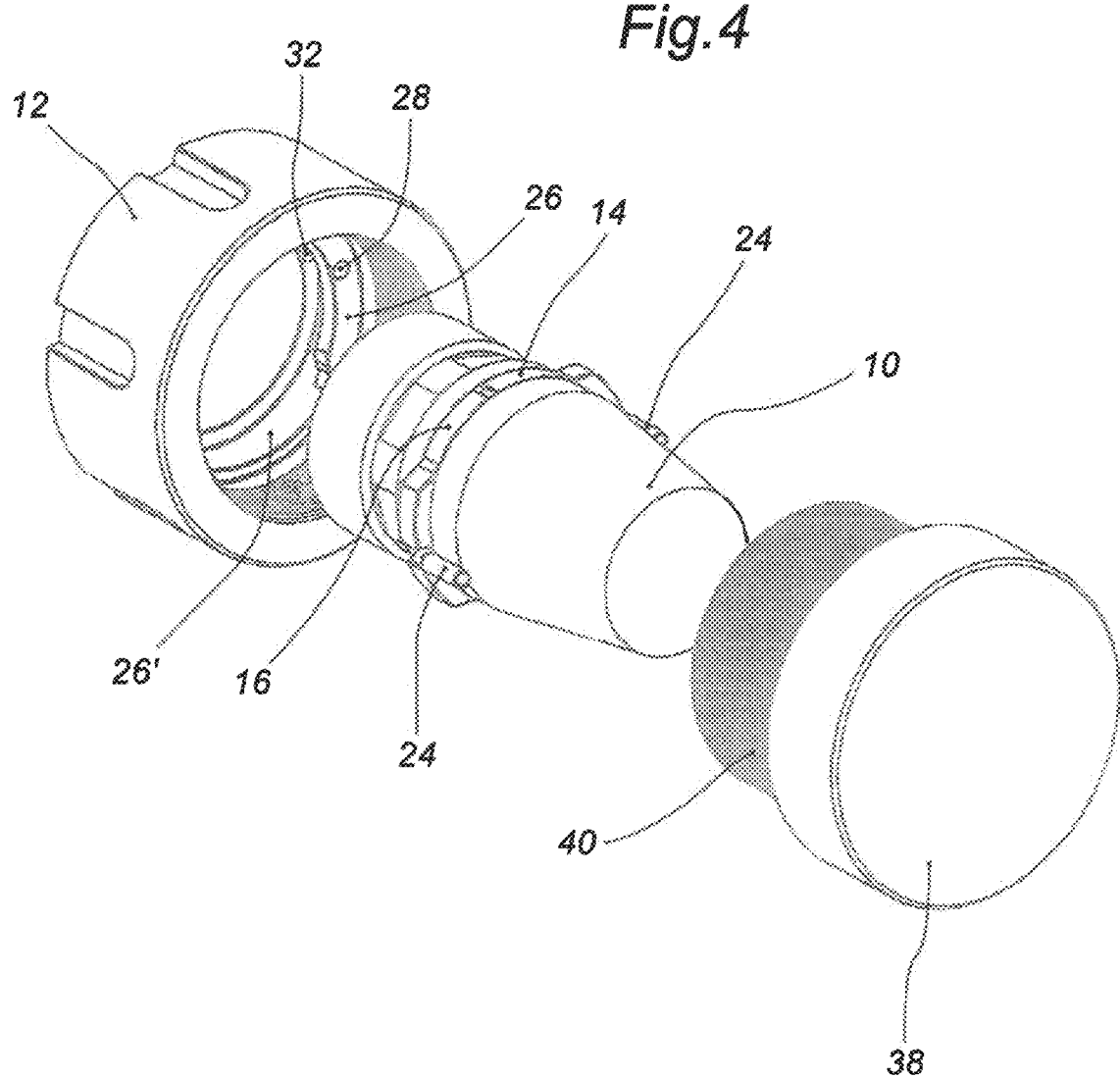
FIG. 4 shows schematically, in exploded view, the same device and the additional element consisting of the head of the threaded shaft.

According to the invention, each of the said half-rings defines a substantially semi-circular extension, with a protuberance protruding in a central position and externally to form a shaped prominence 20; said prominence 20 has an external curved-convex profile, compatible with that of the seat, described below, made in the ring nut 12. On the prominence 20 of each of the shaped half-rings 14 and 16 a recess 22 is made, preferably in the central position, extending in the direction of the thickness of said half-rings, which have, for example, a rectangular cross-section. The recesses 22 are predisposed to house respective elastic pins 24, by means of which the shaped half-rings 14 and 16 are firmly connected inside the ring nut 12. Said ring nut internally defines an integral discontinuous circular crown, formed of opposite portions 26 (only one of which is visible in FIGS. 2, 3 and 4) in which the opposite lowered areas 26' allow the passage of the shaped prominences 20 of the shaped half-rings 14 and 16 arranged in the groove 18 of the shank 10; the shaped prominences 20 pass beyond the circular crown to create a so-called "bayonet" type coupling with it. Along the two opposite portions 26 of the circular crown, respective through holes 28 are made for the passage of the elastic pins 24, which firmly connect the half-rings 14, 16 and thus the shank 10 with the ring nut 12. An additional circular crown 30, made on the ring nut 12 rearwards of the portions 26, is provided with other blind holes 32, facing and aligned with the through holes 28 of the portions 26. The shank 10, with the shaped half-rings 14, 16 arranged in the groove 18 and held there by the grease they are previously coated with, is inserted in the ring nut 12 and stabilized in it, after rotation of about 90°, by means of the aforementioned bayonet coupling; this operation allows the elastic pins 24 to be aligned with the holes 28 of the portions and forced into them to obtain the definitive fixing of the shank 10 to the ring nut. The elastic pins 24 are thus permanently engaged in the holes 28 of the portions 26 and protrude from them to fit further into the blind holes 32 made on the circular crown 30, for an additional guarantee of fastening and protected from any possibility of movement.

Figure 5:
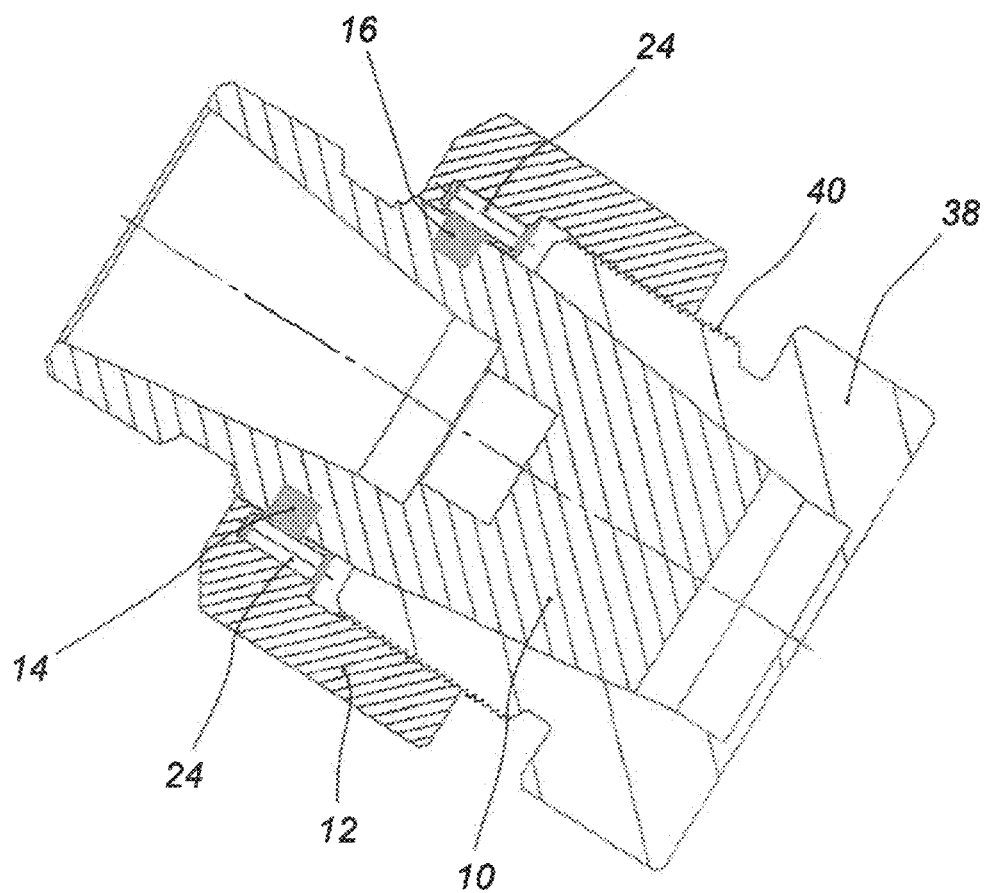
FIG. 5 shows, schematically, a longitudinal cross-section of the components in FIG. 4.

The assembly consisting of the shank 10 with the shaped half-rings 14, 16 mounted on it, the ring nut 12 with the elastic pins inserted in the through-holes 28 and blind holes 32, is subsequently mounted in the seat made inside the rotating shaft 38, as shown in FIG. 5; assembly is carried out by manual clockwise rotation of the ring nut 12, which is screwed onto the front or threaded head 40 thereof. By rotating the ring nut 12 anti-clockwise the assembly is unlocked and can be removed.

As may be seen from the above, the advantages which the invention achieves are evident.

The device for the controlled stabilization of tool holder shanks of the present invention does not involve the use of dowels radially inserted in the ring nut 12 to stabilise the tool holder shank 10 and allow them to rotate without being detached. This stabilization, carried out inside the ring nut 12 with the elastic pins 24, is extremely effective and avoids the danger of the prior art that accidentally the dowels themselves can loosen and be expelled with violence from the ring nut with serious danger both for the safety of people and for the integrity and operational continuity of the machine tool.

In addition, the device of the invention ensures that the tool holder shank remains permanently in the operating position, with no possibility of axial displacement.

Despite the invention having been described above with particular reference to one of its embodiments, given solely by way of a non-limiting example, numerous modifications and variants will appear evident to a person skilled in the art in the light of the above description. The present invention therefore sets out to embrace all the modifications and variants which fall within the sphere and scope of the following claims.

What is claimed is:

1. A device for controlled stabilization of a tool holder shank on a respective ring nut, said tool holder shank being motorized or non-motorized, and predisposed for ER or other type fixing, the tool holder shank having a truncated conical shape and provided externally with a groove, the device comprising:

a connecting means for connecting said ring nut to said tool holder shank, the connecting means arranged inside said ring nut and having an annular body formed of at least two shaped half-rings which include opposite protrusions projecting radially outward with respect to a central axis of the annular body, each protrusion positioned centrally on each half-ring to form a shaped prominence having an arched-convex outer profile;

wherein the ring nut internally defines an integral, segmented first circular crown formed by opposite portions alternating with lowered areas positioned between adjacent opposite portions and through which the shaped prominences of the shaped half-rings arranged in the groove of the tool holder shank are inserted to provide a bayonet coupling with the ring nut after angular rotation of said tool holder shank; and wherein the opposite portions of the segmented first circular crown each include through-holes that are dimensioned for passage of corresponding elastic pins which firmly connect the shaped half-rings and the tool holder shank with the ring nut.

2. The device according to claim 1, wherein the shaped prominences of each of the shaped half-rings include a recess to accommodate a respective one of the elastic pins, each elastic pin being configured and arranged to extend in a direction of the central axis so as to secure the at least two shaped half-rings within the ring nut.

3. The device according to claim 2, wherein the recesses are provided centrally on the at least two shaped half-rings.

4. The device according to claim 2, wherein the ring nut includes a second circular crown formed internally and rearwardly of the opposite portions of the first circular crown, the second circular crown being provided with blind holes facing and aligned with the through-holes of said opposite portions.

5. The device according to claim 4, wherein the tool holder shank and the ring nut interface and are arranged so that each recess of the corresponding prominence is positioned between and aligned with a respective through-hole and blind hole pair, each of the elastic pins being inserted through a corresponding through-hole, recess and blind hole set to lock the tool holder shank to the ring nut.

6. The device according to claim 1, wherein each of said shaped half-rings has a rectangular cross section.

\* \* \* \* \*